United States Patent
Daisy et al.

(10) Patent No.: US 11,979,200 B2
(45) Date of Patent: May 7, 2024

(54) SYSTEM AND A METHOD FOR EXTRACTING LOW-LEVEL SIGNALS FROM HI-LEVEL NOISY SIGNALS

(71) Applicant: Camero-Tech Ltd., Kfar Neter (IL)

(72) Inventors: Ron Daisy, Raanana (IL); Amir Beeri, Zoran (IL)

(73) Assignee: CAMERO-TECH LTD., Kfar Neter (IL)

(*) Notice: Subject to any disclaimer, the term of this patent is extended or adjusted under 35 U.S.C. 154(b) by 248 days.

(21) Appl. No.: 17/379,001

(22) Filed: Jul. 19, 2021

(65) Prior Publication Data
US 2022/0029716 A1 Jan. 27, 2022

(30) Foreign Application Priority Data
Jul. 23, 2020 (IL) .......................................... 276249

(51) Int. Cl.
*H04B 17/336* (2015.01)
*G06F 18/23213* (2023.01)
(Continued)

(52) U.S. Cl.
CPC ..... *H04B 17/336* (2015.01); *G06F 18/23213* (2023.01); *H04B 1/10* (2013.01); *H04B 17/26* (2015.01)

(58) Field of Classification Search
CPC .......... H04M 1/72472; H04M 1/7243; H04M 1/72451; H04M 1/72454; H04M 1/72457;
(Continued)

(56) References Cited

U.S. PATENT DOCUMENTS 6,888,879 B1 5/2005 Lennen
7,110,473 B2 9/2006 Miller et al.
(Continued)

FOREIGN PATENT DOCUMENTS

CN 106772365 B 5/2017
CN 108615018 A * 10/2018 ............... G06K 9/00
(Continued)

OTHER PUBLICATIONS

Agostini, V. and Knaflitz, M., 2011. An algorithm for the estimation of the signal-to-noise ratio in surface myoelectric signals generated during cyclic movements. IEEE transactions on biomedical engineering, 59(1), pp. 219-225.*
(Continued)

*Primary Examiner* — Zhitong Chen
(74) *Attorney, Agent, or Firm* — BROWDY AND NEIMARK, P.L.L.C.

(57) ABSTRACT

A method for extracting a sought signal from a noisy signal. The method includes sampling a plurality of samples in a series of cycles of the noisy signal wherein each sample having an n-bit sampled value ($n \geq 1$), giving rise to a plurality of samples each associated with a respective cycle of the series, wherein each sample is sampled at time T relative to the origin of the respective cycle. The method further includes associating data indicative of the plurality of n-bit samples to N bins according to the corresponding sampled values, wherein N is a function of n, and calculating data indicative of a number of samples for each bin, giving rise to data indicative N-bins histogram or normalized N-bins histogram. The method further includes determining the signal value based on the data indicative of the N-bins histogram or normalized N-bins histogram.

25 Claims, 5 Drawing Sheets

(51) Int. Cl.
*H04B 1/10* (2006.01)
*H04B 17/26* (2015.01)

(58) Field of Classification Search
CPC ........ G06F 9/542; G06F 3/048; G06F 3/0482; G06F 3/0484; G06F 3/04847; G06F 3/0416
See application file for complete search history.

(56) References Cited

U.S. PATENT DOCUMENTS

| | | | |
|---|---|---|---|
| 9,722,830 | B1 | 8/2017 | Shanfield |
| 2015/0301167 | A1 | 10/2015 | Sentelle et al. |

FOREIGN PATENT DOCUMENTS

| | | |
|---|---|---|
| JP | 2002221546 A | 8/2002 |
| JP | 2010045622 A | 2/2010 |
| WO | 2018160886 A1 | 9/2018 |
| WO | 2019081089 A1 | 5/2019 |

OTHER PUBLICATIONS

Tapang, G. and Saloma, C., 2002. Dynamic-range enhancement of an optimized 1-bit A/D converter. IEEE Transactions on Circuits and Systems II: Analog and Digital Signal Processing, 49(1), pp. 42-47.*

Tapang, G., & Saloma, C. (2002). Dynamic-range enhancement of an optimized 1-bit A/D converter. IEEE Transactions on Circuits and Systems II: Analog and Digital Signal Processing, 49(1), 42-47.

Bey, Nouredine Yahya, Extraction of Buried Signals in Noise: Correlated Processes, Int. J. Communications, Network and System Sciences, 3:855-862 (2010).

Lima, et al., Spectrum sensing with a parallel algorithm for cyclostationary feature extraction, Computers and Electrical Engineering, 71:151-161 (2018).

\* cited by examiner

Fig. 3A (12.8GHz)

SYSTEM AND A METHOD FOR EXTRACTING LOW-LEVEL SIGNALS FROM HI-LEVEL NOISY SIGNALS

TECHNOLOGICAL FIELD

The present invention is in the field of extracting low-level signals buried in a hi-level noisy signal.

BACKGROUND ART

References considered to be relevant as background to the presently disclosed subject matter are listed below:
1. JP2010045622(A)—Signal Detector
2. JP2002221546(A)—Time Periodic Feeble Signal Detection Method in Noise, its Device, its Program and its Recording Medium
3. U.S. Pat. No. 9,722,830(B1)—Detection of low level communication signals in high level noise
4. U.S. Pat. No. 7,110,473(B2)—Mode controller for signal acquisition and tracking in an ultra wideband communication system
5. https://tinyurl.com/ybd17zrv—Dynamic-Range Enhancement of an Optimized 1-Bit A/D Converter Acknowledgement of the above references herein is not to be inferred as meaning that these are in any way relevant to the patentability of the presently disclosed subject matter.

BACKGROUND

There are numerous real-life scenarios where a signal of interest is embedded in a noisy signal with low SNR. A typical yet not exclusive example is a radar signal that is reflected from an illuminated object and is received by the radar antenna. The signal is in many cases contaminated by hi-level noise (low SNR) that stems from ambient and other known per se conditions, and it is therefore required to extract the signal from the received noisy signal.

There are numerous known devices that purport to achieve this goal. Some are very costly and cumbersome and consume hi-power, and are therefore not suitable, for instance for operational use by the relevant human operator who needs to carry the device for outdoor use and/or is required to use it for a relatively long period of time while relying on only battery power. Others are not adequate for hi-rate sampling as required in certain applications.

There is thus a need in the art to provide for a new system and method for extracting low-level signals from hi-level noisy signals.

There is a further need in the art for a new long-range through-wall sensing device having antenna elements for transmitting and receiving signals adapted to pass through a wall for detecting objects therebehind.

GENERAL DESCRIPTION

In a first of its aspects, the present invention provides a method for extracting a sought signal from a noisy signal, the method comprising, by a circuitry:
 a) sampling a plurality of samples in a series of cycles of the noisy signal wherein each sample having an n-bit sampled value (n≥1), giving rise to a plurality of samples each associated with a respective cycle of said series;
 and w % herein each sample is sampled at time T relative to the origin of the respective cycle;
 b) associating data indicative of the plurality of n-bit samples to N bins according to the corresponding sampled values, wherein N is a function of n, and
 c) calculating data indicative of a number of samples for each bin, giving rise to data indicative N-bins histogram or normalized N-bins histogram;
 d) determining the signal value based on the data indicative of the N-bins histogram or normalized N-bins histogram.

In accordance with an embodiment of the invention, there is further provided a method wherein said step (a) further includes:
 i) sampling in each cycle a batch of samples that includes a succession of at least two samples and performing said steps a-c with respect to each sample in the batch, giving rise to a determined series of signal values, constituting said sought signal.

In accordance with an embodiment of the invention, there is yet further provided a method, wherein the SNR of the noisy signal is low.

In accordance with an embodiment of the invention, there is yet further provided a method, wherein said low SNR complies with the following equation:

$$\text{Min}\{P_1, P_2, \ldots P_N\} \cdot \text{Num} > 1,$$

wherein $P_1, P_2, \ldots P_N$ are the normalized N-bins Histogram probabilities, and Num stands for the number of said plurality of samples, and N stands for the $N^{th}$ bin of N number of bins.

In accordance with an embodiment of the invention, there is yet further provided a method, wherein N being a function of n equals to $2^n$.

In accordance with an embodiment of the invention, there is yet further provided a method, wherein steps a-c are performed while the sought signal is retained substantially invariable.

In accordance with an embodiment of the invention, there is yet further provided a method, wherein the cycle time duration depends on a signal repletion frequency.

In accordance with an embodiment of the invention, there is yet further provided a method, wherein the plurality of samples are sampled at a frequency that complies with the Nyquist sampling theorem.

In accordance with an embodiment of the invention, there is yet further provided a method, wherein the noisy signal is characterized by a Gaussian distribution.

In accordance with an embodiment of the invention, there is yet further provided a method, wherein n=1.

In accordance with an embodiment of the invention, there is yet further provided a method, wherein the data indicative of the samples being "1" or "0" according to the sign of the sample and wherein number of bins N=2.

In accordance with an embodiment of the invention, there is yet further provided a method, wherein the data indicative of normalized N bins histogram complies with the equation:

$$\text{Num}^{(+)}/(\text{Num}^{(+)} + \text{Num}^{(-)}), \text{ or } \text{Num}^{(-)}/(\text{Num}^{(+)} + \text{Num}^{(-)}),$$

where $\text{Num}^{(+)}$ equals the number of positive signs and $\text{Num}^{(-)}$ equals the number of negative signs and $\text{Num}^{(+)} + \text{Num}^{(-)}$ equals the number of plurality of samples.

In accordance with an embodiment of the invention, there is yet further provided a method, wherein said determined signal value complies with the equation:

$$v_0 = -\sqrt{2}\sigma \cdot \text{erfc}^{-1}(2 \cdot \text{Num}^{(+)}/\text{Num}))$$

In accordance with an embodiment of the invention, there is yet further provided a method, for use in a through-wall image acquisition device having antenna elements for transmitting and receiving signals adapted to pass through at least one obstacle for imaging objects.

In accordance with an embodiment of the invention, there is yet further provided a method, wherein the image acquisition device being a radar with an array of antennas configured to transmit and receive signals.

In accordance with an embodiment of the invention, there is yet further provided a method, wherein the cycle time duration depends on a signal repletion frequency.

In accordance with an embodiment of the invention, there is yet further provided a method, wherein the duration of the batch of samples depends on an end range, which equals to the start range plus the maximal depth behind an obstacle from which the noisy signal is reflected.

In accordance with an embodiment of the invention, there is yet further provided a method, wherein T=2StartRange/C, where C stands for the speed of light.

In accordance with a further aspect of the invention, there is provided a system for extracting a sought signal from a noisy signal, the system comprising a circuitry that includes:
  a sampler for sampling a plurality of samples in a series of cycles of the noisy signal wherein each sample has an n-bit sampled value (n≥1), giving rise to a plurality of samples each associated with a respective cycle of the series;
    and wherein each sample is sampled at time T relative to the origin of the respective cycle;
  a processing circuitry operatively coupled to the sampler, for associating data indicative of the plurality of n-bit samples to N bins according to the corresponding sampled values, wherein N is a function of n, and
  the processing circuitry is further adapted to calculate data indicative of a number of samples for each bin, giving rise to a data indicative N-bins histogram or a normalized N-bins histogram;
  the processing circuitry is further adapted to determine the signal value based on the data indicative of the N-bins histogram or normalized N-bins histogram.

In accordance with an embodiment of the invention, there is further provided a system, further comprising a Deserializer module operatively coupled to the sampler for reducing the bit-rate of the sampler to correspond to an operable processing rate of the processing circuitry.

In accordance with an embodiment of the invention, there is further provided a system, wherein the sampler is adapted to sample, in each cycle, a batch of samples that includes a succession of at least two samples, and wherein the processing circuitry is adapted to performing the associating, calculating and determining with respect to each sample in the batch, giving rise to a determined series of signal values, constituting the sought signal.

In accordance with an embodiment of the invention, there is yet further provided a system, wherein the SNR of the noisy signal is low.

In accordance with an embodiment of the invention, there is yet further provided a system wherein said low SNR complies with the following equation:

$$\mathrm{Min}\{P_1, P_2, \ldots P_N\} \cdot \mathrm{Num} > 1,$$

wherein $P_1, P_2, \ldots P_N$ are the normalized N-bins Histogram probabilities, and Num stands for the number of said plurality of samples, and N stands for the $N^{th}$ bin of N number of bins.

In accordance with an embodiment of the invention, there is further provided a system, wherein N being a function of n equals to $2^n$.

In accordance with an embodiment of the invention, there is further provided a system, wherein steps a-c are performed while the sought signal is retained substantially invariable.

In accordance with an embodiment of the invention, there is further provided a system, wherein the cycle time duration depends on a signal repletion frequency.

In accordance with an embodiment of the invention, there is further provided a system, wherein the plurality of samples are sampled at a frequency that complies with the Nyquist sampling theorem.

In accordance with an embodiment of the invention, there is further provided a system, wherein the noisy signal is characterized by a Gaussian distribution.

In accordance with an embodiment of the invention, there is further provided a system, wherein n=1 and the sampler being a comparator.

In accordance with an embodiment of the invention, there is further provided a system, wherein the data indicative of the samples being "1" or "0" according to the sign of the sample and wherein number of bins N=2.

In accordance with an embodiment of the invention, there is further provided a system wherein the data indicative of normalized N bins histogram complies with the equation:

$$\mathrm{Num}^{(+)}/(\mathrm{Num}^{(+)} + \mathrm{Num}^{(-)}), \text{or } \mathrm{Num}^{(-)}/(\mathrm{Num}^{(+)} + \mathrm{Num}^{(-)}),$$

where $\mathrm{Num}^{(+)}$ equals the number of positive signs and $\mathrm{Num}^{(-)}$ equals the number of negative signs and $\mathrm{Num}^{(+)} + \mathrm{Num}^{(-)}$ equals the number of the plurality of samples.

In accordance with an embodiment of the invention, there is further provided a system, wherein the determined signal value complies with the equation:

$$v_0 = -\sqrt{2} \sigma \cdot \mathrm{erfc}^{-1}(2 \cdot \mathrm{Num}^{(+)}/\mathrm{Num}))$$

In accordance with an embodiment of the invention, there is further provided system, for use in a through-wall image acquisition device having antenna elements for transmitting and receiving signals adapted to pass through at least one obstacle for imaging objects.

In accordance with an embodiment of the invention, there is further provided a system, wherein the image acquisition device is a radar with an array of antennas configured to transmit and receive signals.

In accordance with an embodiment of the invention, there is further provided a system, wherein the cycle time duration depends on a signal repletion frequency.

In accordance with an embodiment of the invention, there is further provided a system, wherein the duration of the batch of samples depends on an end range, which equals to the start range plus the maximal depth behind an obstacle from which the noisy signal is reflected.

In accordance with an embodiment of the invention, there is further provided a system, wherein said T=2StartRange/C, where C stands for the speed of light.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

In the detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

As used herein, the phrase "for example", "such as", "for instance", "e.g.", and variants thereof describe non-limiting embodiments of the presently disclosed subject matter. Reference in the specification to "(a) certain embodiment(s)", "one embodiment" or variants thereof means that a particular feature, structure or characteristic described in connection with the embodiment(s) is included in at least one embodiment of the presently disclosed subject matter.

Figure 1A:
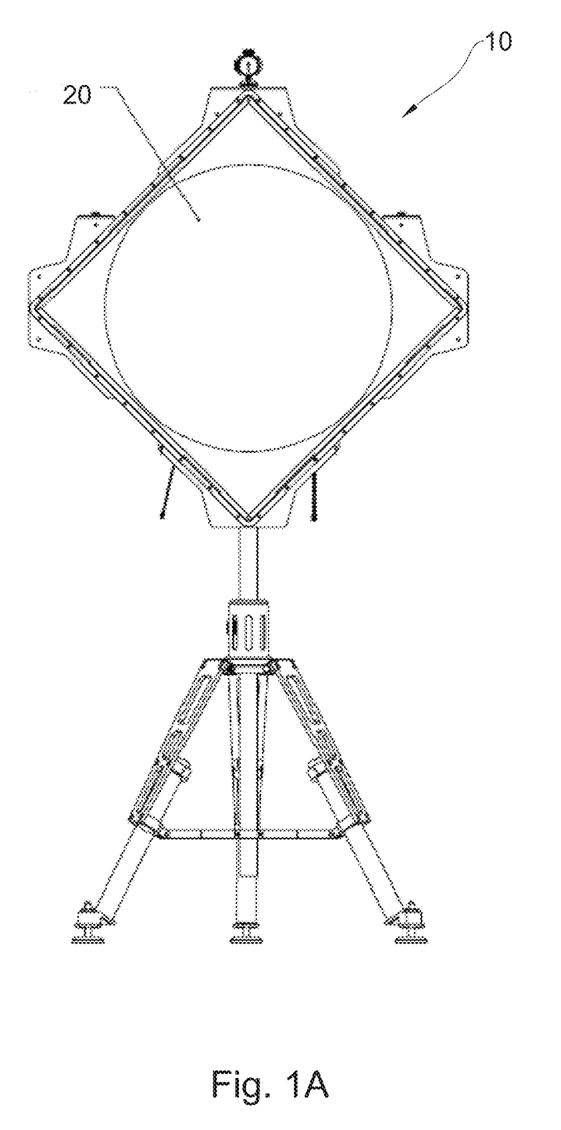
FIG. 1A-1B illustrates schematically a prior art through the wall image acquisition device.

Bearing this in mind, attention is drawn to FIG. 1A illustrating a through-wall image acquisition device (e.g. a radar), generally indicated at 10 in accordance with one embodiment of the present invention. Though not seen in FIG. 1A, the device comprises signal generation and acquisition elements including antenna elements 20 adapted to transmit (hereinafter "transmitters") and antenna elements adapted to receive (hereinafter "receivers"), constituting an antenna array, for transmitting and receiving ultra-wideband signals adapted to pass through a wall for imaging and sensing of objects behind a wall, and signal processing elements, which will later be described in more detail.

Note that for convenience of explanation only, the description below focuses on radar as an example of a signal acquisition device. The invention is not bound by any specific radar, for instance radar with an antenna array configured to transmit and receive signals. Note also that the system for extracting signals in accordance with certain embodiments of the invention is exemplified with reference to objects that are located behind a non-transparent obstacle (say an opaque wall, such as of a wall of a building), normally when the operator cannot view the object (say people) therebehind. Thus, by way of non-limiting example, the system and method in accordance with various embodiments of the inventions may be used for various other applications that do not necessarily involve through the wall imaging, such as perimeter radar, ground penetrating radar, medical imaging and/or others, where the sought signal has a very low SNR Reverting to FIGS. 1A and 1B, signal generation and acquisition elements of the device 10 may include, in addition to the antenna array, elements responsible for sampling, synchronization, multiplexing, and processing of the acquired signals. Signal processing elements may include a processing unit (or units) adapted for the processing signals received from the signal acquisition elements, all as known per se.

Figure 1B:
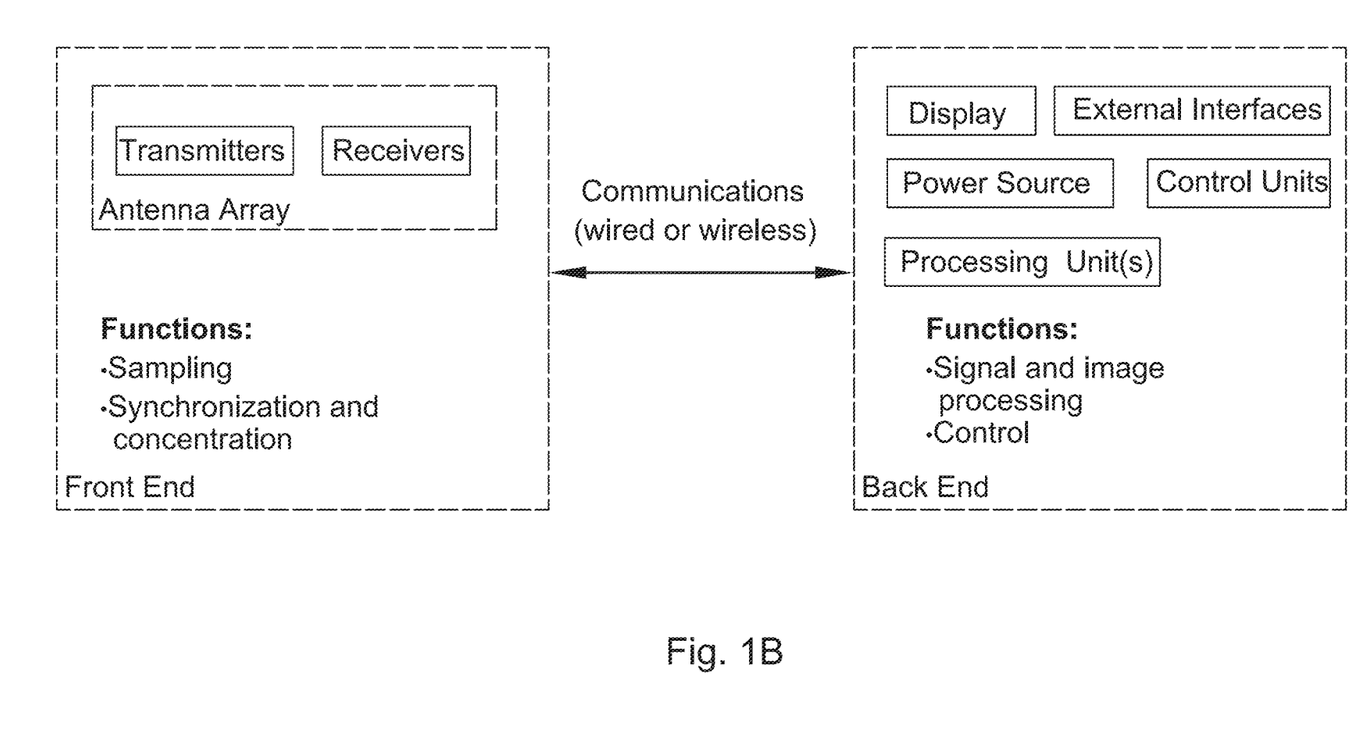

Note that the through-the-wall image acquisition device shown in FIGS. 1A and 1B, is described in a generalized and schematic manner for a better understanding of the utilization of the system and method of the invention in a through-the-wall application. Note that the invention is neither bound by the specified through-the-wall image acquisition device, nor by the through-the-wall imaging application, nor by radar applications at all.

Figure 2:
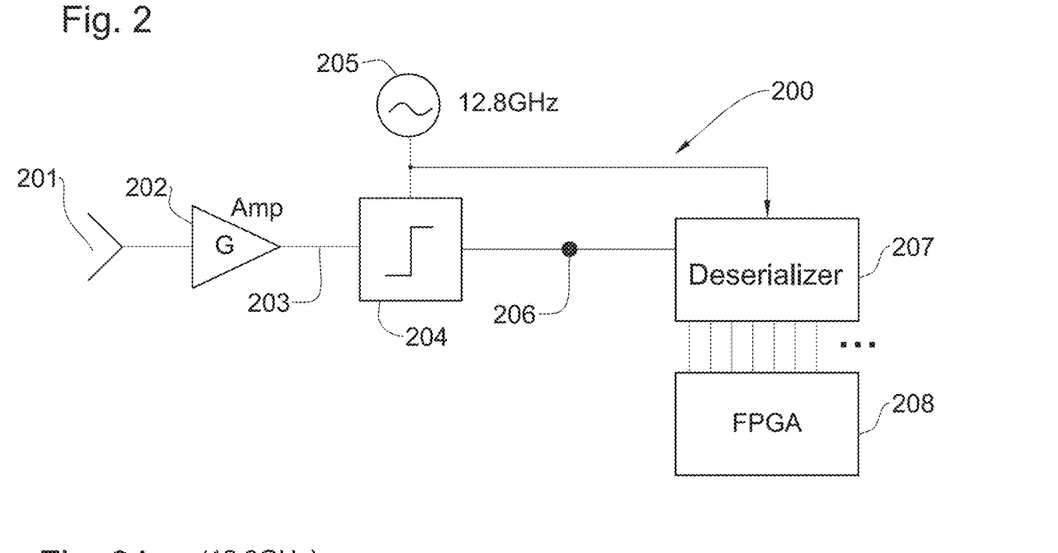
FIG. 2 illustrates schematically a block diagram of a signal extractor system, according to a certain embodiment of the presently disclosed subject matter.
Figure 3A:
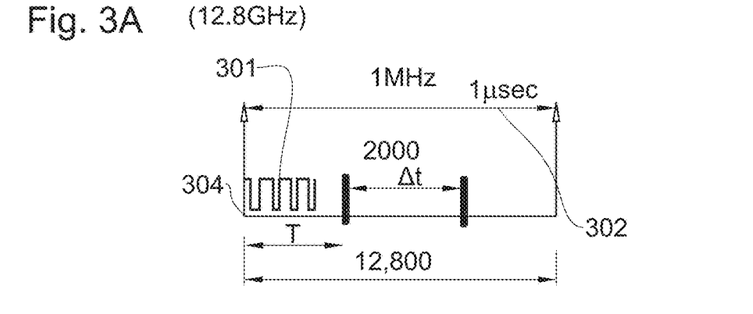
FIG. 3A illustrates schematically an antenna radar cycle synchronized with the operational clock of the samples, according to certain embodiments of the presently disclosed subject matter.

Attention is now drawn to FIG. 2 illustrating schematically a block diagram of a signal extractor system, according to a certain embodiment of the presently disclosed subject matter, and to FIG. 3A illustrating an antenna radar cycle synchronized with the operational clock of the samples, according to certain embodiments of the presently disclosed subject matter. Thus, consider an exemplary through-the-wall application, where a through-the-wall image acquisition device, (say a portable device carried by a an operator, or a friendly soldier or fire fighter) is activated at a distance of L from a wall (start range), in order to obtain an image for the object or objects that are located behind the wall. For instance, in order to locate survivors who failed to escape in a disaster (say fire) scene and are trapped behind the wall in a room, or, say, in order to detect an enemy squad who may hide behind a wall in a true combat scene. Thus, in response to activation of the through-the-wall image acquisition device, the radar repeatedly transmits an appropriate signal (such as a pulse), utilizing the transmitter(s) of the antenna array, at a selected repetition rate (PRF herein, referred to also as signal repetition frequency) of, say, 1 MHz, the signal propagates, impinges on the wall and penetrates therethrough along a distance ΔL (end range–start range). The signal is reflected from any object that it impinges upon (i.e. reflected from the wall and any object therebehind until EndRange=StarRange+ΔL). It has to be noted that the signal transmission repetition rate may be compatible by the needed EndRange, and in order to prevent range ambiguity one should comply with the constraint:

$$\frac{2*EndRange}{c} < \frac{1}{PRF},$$

where c is the speed of light at vacuum and PRF is the transmitted signal repetition rate. Due to the (lossy) obstacle (a wall being an example), and the sensing range, the received signal's intensity drastically attenuates and its intensity becomes much smaller than the noise intensity, giving rise to a noisy signal that is received by the antenna, where, put intuitively, the sought signal component (i.e. the signal that originates from the object of interest) is "buried" in the noise component of the noisy signal. The invention is of course not bound by the specified PRF of 1 MHz. Specifically, under certain operational conditions, such as for the example of PRF equals 1 MHz, the EndRange is limited to about 150 meters. This is of course only an example. Thus, for example, for short range radars (say, of the order of tens of meters), the PRF is of the order of MHz(s), whereas for long range radars (say, of the order of hundreds of KMs), the PRF is of the order of KHz(s) or less. The latter are of course only non-limiting examples.

Reverting now to the circuitry 200 in FIG. 2, the noisy signal is received by receiver antenna 201, at cycles of say 1 μsec (assuming radar PRF of 1 MHz) and is fed to amplifier 202 which amplifies the received noisy signal by a factor of say G. Note that the term noisy signal embraces also known per se pre-processing (e.g. amplification and/or filtering, etc.) before being sampled. In some embodiments, due to a possible hysteresis effect in the sampler 204, the amplifier gain factor, G, should be large enough such that the sampled noisy signal level is much higher (say 10 fold) than the hysteresis level.

The so amplified noisy signal 203 is fed to a sampler 204, e.g. a 1-bit comparator 204 (or in case of n>1 bits, these are sampled using a different known per se sampler, such as ADC). The sampler 204 is triggered by a clock 205 at a frequency (herein the sampling rate) that is typically considerably higher than that of the PRF of the radar, say 12.8 GHz, complying with the Nyquist sampling criterion, which requires that the sampling rate must be at least twice the highest frequency component of the sampled signal. In a typical, yet not exclusive, ultra-wide-band radar used for through wall sensing, the highest frequency component is about 5 GHz, thus the sampling rate should be greater than 10 GHz. Note that, as clearly shown in FIG. 3A, there are a plurality of clock cycles that drive the sampler 204 (e.g. cycle 301) within one radar operational sampling cycle 302, and more specifically, by this example 12,800 sampler clock cycles within one radar cycle.

Figure 3B:
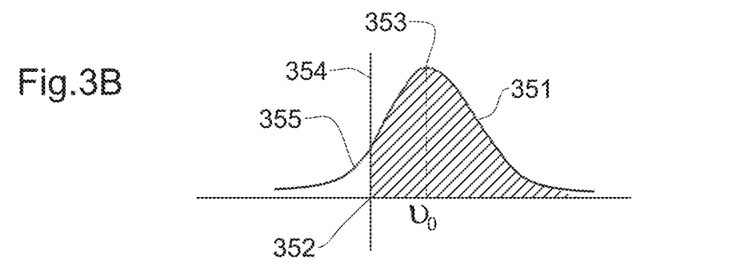
FIG. 3B illustrates schematically an exemplary distribution of samples taken at a specific range-cell; this distribution represents low Signal to Noise Ratio (SNR)—the signal is represented by the sample value $v_0$ while the noise standard deviation is higher than said sample value.

Before moving on, attention is drawn to FIG. 3B illustrating schematically an exemplary Gaussian distribution of a noise sample and the pertinent noisy signal 351 with a very low Signal to Noise Ratio (SNR). Put simply, the noisy signal model complies with the equation $\alpha=V_0+noise$, where a stands for the noisy signal, $V_0$ stands for the sought signal and noise stands for (by the example of FIG. 3B) Gaussian distributed random variable with zero average and standard deviation of σ. As shown, the noisy signal 351 is shifted relative to the origin 352. By this example, the shift is in the positive direction along the abscissa axis which is affected by the low and invariable signal $V_0$ (very low SNR). The fact that the sought signal's intensity is considerably lower than that of the noise is manifested in the graph of FIG. 3B in that the peak of the Gaussian distribution 353 is only slightly shifted relative to the origin. Thus, had the noisy signal of FIG. 3B been devoid of signal (i.e. "pure" Gaussian noise), the peak 353 of the Gaussian distribution graph would have coincided with the ordinate axis 354. As will be explained in greater detail below, in accordance with certain embodiments, it is mandatory that the SNR will be low (intuitively "signal buried in the noise") in order to avoid saturation. In the graph of FIG. 3B, this low SNR characteristic is reflected in that the shift of the noisy signal relative to the origin (in this example in the positive direction along the abscissa axis) should retain sufficient "tail" also in the negative section of the abscissa (see section 355 in FIG. 3B). Note that, in the latter example, in case the sought signal is negative (i.e. $V_0<0$), the Gaussian distribution had been shifted towards that negative section of the abscissa (negative relative to the origin), and in order to meet the low SNR condition, sufficient tail had to be retained in the positive section of the abscissa axis (relative to the origin). This characteristic of low SNR ("signal buried in the noise"), will be explained in greater detail below. Thus, by way of example, had $V_0$ been >>0 (failing to meet a low SNR condition) such that the entire Gaussian graph distribution would have been shifted leaving no tail at the negative section of the abscissa (see hashed graph 356), this would have led to saturation that would not have allowed extraction of the sought signal $V_0$ from the noisy signal.

Figure 3C:
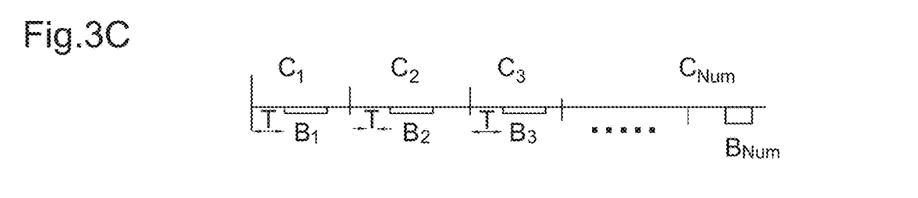
FIG. 3C illustrates a series of antenna radar cycle synchronized with corresponding batches of samples, according to certain embodiments of the presently disclosed subject matter.
Figure 3D:
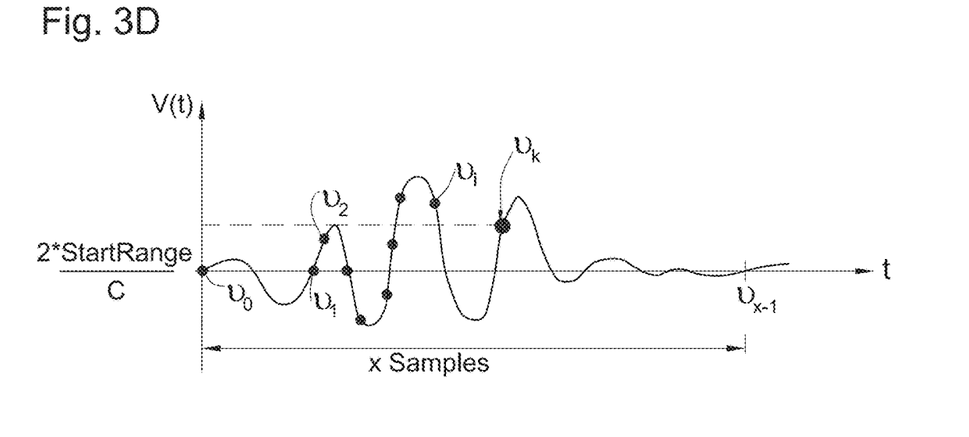
FIG. 3D illustrates schematically an exemplary sought signal that is reflected from an object and is being extracted by a system according to certain embodiments of the presently disclosed subject matter.

Reverting to FIG. 2, the noisy signal (characterized e.g. by Gaussian distribution) as described with reference to FIG. 3D is fed to the sampler (e.g. comparator 204) and is sampled (at, say 12.8 G Hz, sampling rate) to give rise to a series of "0" or "1" outputs. As may be recalled, the samples are sampled according to a sampling clock that is synchronized (in a known per se manner) with the radar clock. Thus, focusing again on FIG. 3A, there are a plurality of samples that are synchronized with the radar cycle.

In accordance with certain embodiments, the samples of interest are sampled periodically, namely sampled at the elapse of time T 303 (relative to the origin of the cycle 304 see FIG. 3A) in respective cycles. Note that the characteristics of T will be discussed in more detail below. Turning to FIG. 3C, there is shown a series of (e.g. consecutive) cycles (of which $C_1$ to $C_3$, and $C_{Num}$ are shown). As shown, a plurality of samples (i.e. Num sample) are sampled, each, at time T relative to its respective cycle (giving rise to samples $S_{1,1}$ for cycle $C_1$, $S_{2,1}$ for cycle $C_2$ and so forth, until $S^{Num,1}$ – for cycle $C^{Num-}$ not shown in FIG. 3C). Also note that by this example each sample is of 1-bit long and they are sampled from a noisy signal having a Gaussian distribution. The invention is neither bound by 1 bit samples, nor by the Gaussian distribution, and indeed FIG. 3C depicts a batch of samples (each n>1 bit long), designated $B_1$, $B_2$, $B_3$, and $B_{Num}$. Note that the batch of samples embodiments, will be discussed in greater detail below.

Reverting to the 1 bit sample example, the sampler yields "1" or "0" depending on the sign of the signal (buried in noise) at the sampling instant. Assuming that the sought signal is positive—as depicted by way of example in FIG. 3B, naturally there will be more positive samples (say "1"s) than negative ("0"s). Intuitively, the value of the sought signal is related to the probability of yielding a positive (or negative) sample values $Num^{(+)}/Num$ or $(Num^{(-)}/Num)$, where Num stands for the total number of samples, and $Num^{(+)}$ stands for the number of observed positive value samples (say number of "1"s outputted of the comparator), and $Num^{(-)}$ stands for the number of negative value samples (say number of "0"s outputted of the comparator). Note that the data indicative of said samples are not necessarily "1" and "0" and may be determined according to the implementation under consideration.

Reverting now to the time duration T (see e.g. FIG. 3A) it indicates the time duration (or number of clocks that correspond to the time duration) that elapses from commencing a cycle until signal of interest is sampled. Considering the radar application, it corresponds to the time that has elapsed from the transmittal time of the signal from the transmitting antenna of the radar, until the received signal starts to be sampled (e.g. from time 0 in cycle $C_1$ until sample $S_{1,1}$ is sampled—see FIG. 3C). This duration equals to the travel time of the transmitted signal from the radar antenna to the obstacle distance to the obstacle=StartRange) and the round trip back from the obstacle to the radar receivers, for sampling the reflected signal (say sample $S_{1,1}$) within a cycle (say cycle $C_1$). Thus, T=2StartRange/C, (C stands for the speed of light). Note that the specified equation of T assumes that the path from the transmission antenna to the obstacle is free of any obstacle.

Note that in accordance with certain embodiments, the noisy signals that are received during the time duration 7 although not reflected from an object and therefore apparently may be composed of noise only, may nevertheless be sampled and processed, all depending upon the particular application.

In accordance with other embodiments, the signals that are received during the specified time duration T are discarded (and other sections of the received signal are sampled. This may be implemented, for instance, by sampling the signals, but not processing them (as will be discussed in greater detail with reference to FIG. 4) or, by another non-limiting example, not even sampling them. The latter may be implemented e.g. by coupling to the comparator 204 a designated logic circuitry (not shown) that neutralizes the sampling by the comparator 204 during the time duration T. The invention is not bound by these implementations.

Note also that in accordance with certain embodiments, the StartRange may indicate a distance that extends from the transmitting antenna elements to the nearest face of the obstacle. This is however not limiting. Thus, for example, in accordance with various other embodiments, the StartRange is a user selectable parameter, for example the user can decide to "look" 10 meters behind the wall. By another non-limiting example, the StartRange may be selected such that it includes one or more obstacles (e.g. a few walls, one behind the other), all depending upon the particular application.

Note also that in accordance with certain embodiments, instead of one sample per cycle, a batch of x samples (x>1) per cycle may be sampled and processed e.g. starting from T and extending for additional $\Delta t$ (or its equivalent in number of samples). For example, in FIG. 3A, additional samples are obtained (say x=2000), giving rise to a batch of 2000 consecutive samples $S_{1,1}$ to $S_{1,2000}$ for $C_1$. Similarly, in following (say consecutive) cycles, a batch of 2000 samples are sampled at corresponding sampling times (starting at time T from the origin of the corresponding cycle and extending over additional $\Delta t$ (e.g. designated $S_{2,1}$ to $S_{2,2000}$ for cycle $C_2$, $S_{3,1}$ to $S_{3,2000}$ for cycle $C_3$ and so forth). The number of additional samples (related to said additional $\Delta t$) is related to the distance of interest behind the obstacle.

The additional $\Delta t$ duration is needed in order to cover the $\Delta L$ distance behind the obstacle. In accordance to previous definitions, $$\Delta t = \frac{2\Delta L}{C} = 2(stopRange - startRange)/C.$$

A more detailed discussion that pertains to a batch of x samples per cycle (where x>1) is given below.

Attention is now reverted to the simplified example of Num cycles, and only one sample per cycle (i.e. a batch of size x=1) each sampled at duration T relative to the origin of its corresponding cycle (e.g. with reference to FIG. 3C samples $S_{1,1}$, $S_{2,1}$, $S_{3,1}$ and $S_{Num,1}$ for cycles $C_1$ to $C_3$ ... $C_{Num}$, respectively, not shown in the FIG. 3C. As discussed, the specified samples yield a value of "1" or "0" depending on whether the value of the noisy signal at the sampling instant is positive or negative.

Reverting now to FIG. 2, in one embodiment, the specified samples (at the output 206 of comparator 204) may be fed to a Deserializer module 207 operatively coupled to said comparator in case there is a need to reduce the bit-rate to correspond to an operable processing rate of the following FPGA (or any other processing circuitry) module 208. As may be recalled, the sampling rate of the comparator may be relatively high, say 12.8 GHz whereas the clock of the FPGA that is operatively coupled to the Deserializer is of the order of 200 MHz (assuming, by way of non-limiting example, deserializing the serial bits to words of 64 bits). By one embodiment, the Deserializer module 207 will accumulate a bulk of samples and will feed them as a bulk to the FPGA module 208 for processing, thereby adapting the processing frequency to that of the FPGA. Note that the FPGA is an example of processing circuitry.

Figure 4A:
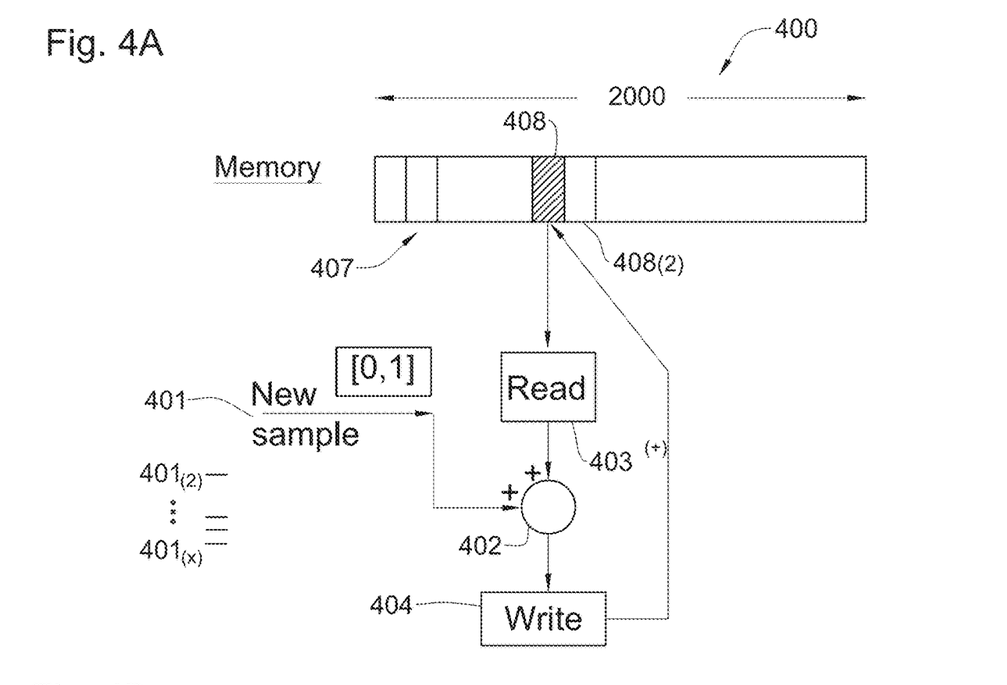
FIG. 4A-B illustrates schematically a block diagram of a processing circuitry, for use in a signal extractor system, according to certain embodiments of the presently disclosed subject matter.
Figure 4B:
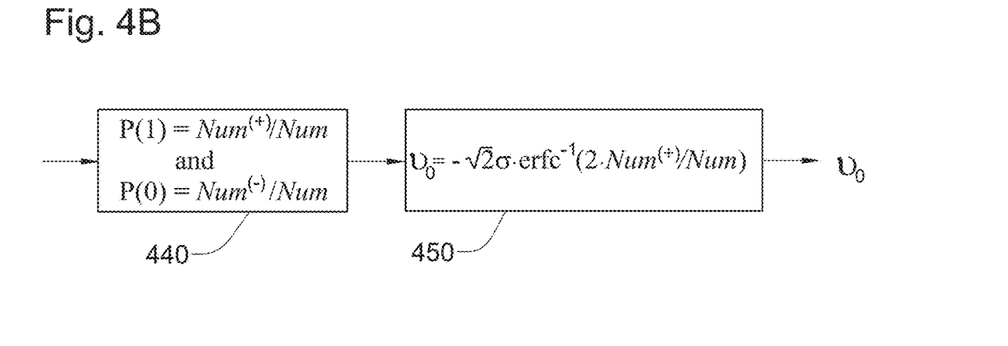

Moving now to the FPGA module 208, attention is also drawn to FIGS. 4A and 4B showing a block diagram of a processing circuitry 400 (e.g. the specified FPGA), for use in a signal extractor system, according to certain embodiments of the presently disclosed subject matter.

Note that the invention is not bound by the specified FPGA component (being an example of processing circuitry), nor by the specific block diagram depicted in FIGS. 4A and 4B.

Note also the invention is not bound by the specified circuitry of FIG. 2.

Thus, in accordance with certain embodiments, the processing circuitry 400 is configured to store data indicative of the plurality of n-bit samples to N bins according to the corresponding sampled values, wherein N is a function of n (number of bits in each sample). In accordance with the certain embodiment of 1-bit sampling, the specified function is $2^n$. Thus, in the specific case of 1-bit long sample, the number of bins N is 2. Then, the specified circuitry is configured to calculate data indicative of the number of samples per each bin (for example, by counting the number of samples per bin e.g. summing the sampled values for each bin), giving rise to N-bins histogram data). Note that for the case of 1-bit long samples, while 2 bins are used, calculating the number of the samples by summing the samples may apply to only one bin (say Num$^{(+)}$ obtained by summing the samples in the "1"-s bin). The other's bin count of number of the samples (by this example Num$^{(-)}$ of the "0"-s bin) may be calculated by deducing from the total number of samples (Num) the sum of the other bin, or in other words, by this example Num$^{(-)}$=Num−Num$^{(+)}$.

Based on the so determined data indicative of N bins histogram, the sought signal value may be calculated.

For a better understanding of the foregoing, consider a non-limiting implementation of circuitry 400. It includes input 401 for receiving serially the bulk of sampled values (by this example a series of "1" and "0" outputted from comparator 204). It further includes an adder 402 coupled to input 401 and operatively coupled to memory read unit 403 and memory write unit 404. By way of non-limiting example, the write unit and the read unit may be implemented with a dedicated logic adapted to access the memory, including reading the sum value of the current sample, adding this sum to the current sample, and then completing the cycle by writing the new sum to the same memory address.

Also shown in FIG. 4A, is a data structure 407 (by this example, a memory array) for realizing the specified 2-bin summations for all samples. According to the embodiment of FIG. 4A, the Read/Accumulate/Write logic is duplicated per sample. Note that the invention not bound by the specific data structure shown in FIG. 4A. Further elements of processing circuitry 400 are shown in FIG. 4B, and will be discussed in detail below. By the example of FIG. 4A, only one sample 408 is described.

In operation, and at the onset, sample 408 sum content is reset (sum=0). Thus, data indicative each sampled value is fed through input 401 to adder 402. The adder is also fed (through the reader 403) with the sample (single bin) sum (initially sum=0) which is added to the input value fed through input 401. The summed value is then written back (through write element 404) to the (single) bin accumulator 408. For example, in case the fed data is "1" (e.g., being indicative of the Siu sampled value of $C_1$), the sum total 1=1+0 is written back to bin 408. Next, data indicative of the next sampled value input (e.g. $S_{2,1}$ of $C_2$), say "0" is then summed to the so read previous sum (1), giving rise to sum total 1 which is written back to the bin 408. Next, the input data (say 1) indicative of the next sampled value (e.g. $S_{3,1}$ of $C_3$) is summed to the previous read sum (1), giving rise to a sum value 2 (namely 1+1=2) that is written back to bin 408. This procedure is repeated until all the plurality of sampled values are processed in the manner specified.

By this example, the data indicative of the N bin histogram represents the total number of samples associated with each one of the N bins. Thus, for a 2 bins example, the first bin holds the number of samples having the "1" value (say $Num^{(+)}$). As described above, the other "bin" sum may be easily derived, i.e. $Num^{(-)} = Num - Num^{(+)}$. Note that the pertinent additional logic is not shown in FIG. 4A. Moving on, with the 2 bins (N=2) scenario, the data indicative of the N bins histogram being the total number of "1"s in the first bin (say $Num^{(+)}$), and the total number of "0" in the second bin ($Num^{(-)}$). Note that the data indicative of N bin histogram may be represented e.g. as a histogram of two bins (N=2) each storing the number of samples belonging to it ($Num^{(+)}$ and $Num^{(-)}$ respectively).

By another non-limiting example, if the corresponding summed values are divided by the total number of samples Num (see e.g. 440 in FIG. 4B), one gets a normalized N bit histogram which may be referred to as the an estimate for the probability distribution of the sought signal (sampled by N bins)—e.g. for 1-bit sampling, $P("1") = Num^{(+)}/Num$ and $P("0") = Num^{(-)}/Num$, where P(X) is the probability of encountering a positive (X="1") or negative (X="0") sampled value. Note that the specified "estimate" accuracy may depend on the number of statistic sample sizes (e.g. the number of samples Num) and the number of bins N Note that the normalized N-bins histogram may be determined by dividing the number of samples (in each bin) by the total number of samples (say N).

Note that calculating data indicative of the number of samples may be implemented by counting the number of samples per bin, or in accordance with other embodiments summing the number of samples or e.g. sample values, or, by another example, deducting the number of samples from a given initial value, and so forth.

Having obtained the data indicative of the N bins histogram or normalized N bins histogram, there follows the computation stage of calculating sought signal value 450 based on the so determined N bins histogram. Thus, by one specific example, by assuming Gaussian distributed additive noise of standard deviation σ, the sought signal $v_0$ may be calculated in accordance with the following equation.

$$v_0 = -\sqrt{2}\sigma \cdot \text{erfc}^{-1}(2 \cdot Num^{(+)}/Num))$$

where $\text{erfc}^{-1}(\bullet)$ is the inverse error function.

As may be recalled, the signals that are processed by the FPGA 400, are typically those that are of interest, namely those that are sampled after the elapse of time duration T. In cases where the signals that fall in the time duration T are also sampled and fed to the FPGA 400, an appropriate logic (not shown) may be embedded in the FPGA 400 for discarding them. Note that in certain other embodiments, the signals that fall in the specified time duration Tare also of interest (although, apparently, they may represent noise only), and therefore are sampled and processed in the manner specified. In accordance with certain other embodiments, any subset of samples (from the set of 12800 samples—spanning the entire cycle) may be selected, all depending upon the particular application.

Figure 5:
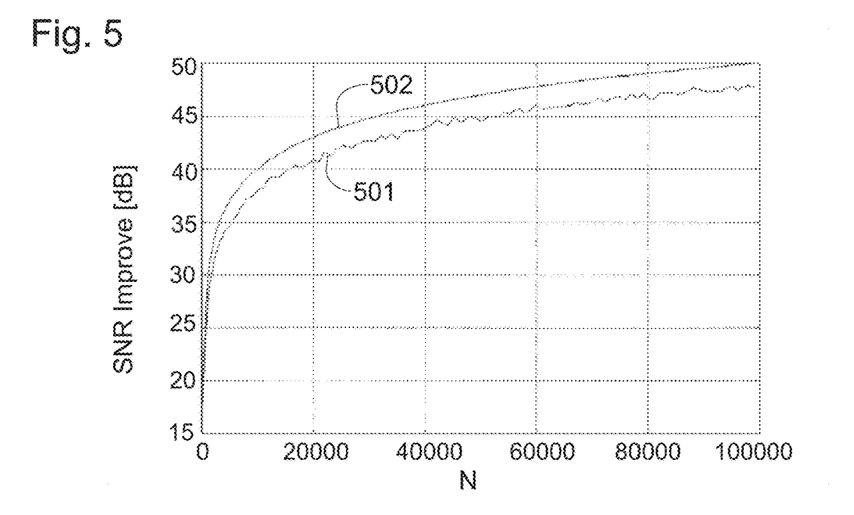
FIG. 5 is a graph showing schematically signal extraction results, achieved by utilizing the signal extracting system, in accordance with certain embodiments of the present invention.

Attention is now reverted to FIG. 5, which shows, schematically, signal extraction performance simulation results, achieved by utilizing the signal extracting system, in accordance with the 1-bit sampling embodiment of the presently disclosed subject matter. In the non-limiting simulated experiment of FIG. 5, the above equation was used to estimate $v_0$ and the SNR improvement (defined as the ratio (in dB) of the estimated signal SNR to the received signal SNR) was calculated as function of Num (501). In the graph, the SNR improvement for estimating the signal based on integrating (averaging) infinite accuracy sampling (10*log 10(Num)) is given as well (502). Note that the price paid for the 1-bit sampling is about 2.15 dB less SNR improvement, compared to the ideal case (502).

Note that in accordance with certain embodiments, it would be advantageous to commence and complete the whole processing described above while the sought signal is retained invariable. It is, thus, appreciated that the proposed solution exemplified above, with reference to FIGS. 2 and 4, utilizes high speed sampling, thereby finalizing the whole computation for extracting the sought signal while the latter is retained invariable. In accordance with certain embodiments, the specified solution allows utilizing low power consuming components, thereby facilitating a long battery life driven signal acquisition system, e.g. for prolonged use of rescue forces that are deployed in a disaster area (for instance, looking for survivors behind obstacles), without a need to recharge the battery.

The specified advantages apply also to the various other embodiments discussed below, including batch of x samples (x>1) and multi-bit (n-bit where n>1) sampling.

The specified description with reference to FIGS. 2-4 focused on the case of a single sample per cycle (corresponding to sampling a signal at time T in every cycle, namely at StartRange. As was discussed in detail above, in the case of a need to sense objects at a distance of up to EndRange (behind the obstacle at depth ΔL=EndRange–StartRange), a batch of x samples are sampled starting from time T relative to the origin of each cycle for a duration that extends over additional Δt (or corresponding number of clocks) where Δt is proportional to said EndRange–StartRange. In the example depicted in FIG. 3A above, the specified time duration Δt corresponds to a batch of 2000 samples, starting from sampling time T relative to the origin of each cycle. The batch of (say 2000) x samples are sampled in each cycle, giving rise to a series of batches (see e.g. $B_1$, $B_2$ and so forth, each starting from time T relative to the origin of respective cycles $C_1$, $C_2$ and so forth). The processing described above is applied independently to each sample in the batch. Thus, the specified processing may apply to the first sample in each batch (say, $\underline{S_{1,1}}$, the batch of $S_{1,1}$, $S_{1,2}$ ... $S_{l,x}$ in cycle $\underline{S_{2,1}}$ in the batch of $S_{2,1}$ $S_{2,2}$ ... $S_{2,x}$ for $C_2$, ... $\underline{S_{Num,1}}$, in the batch of $S_{Num,1}$, $S_{Num,2}$ ... $S_{Num,x}$ of $C_{NUM}$, where Num stands for the number of batches/cycles) that are fed through, say input $401_{(1)}$ (designated as 401) in FIG. 4A and utilizing e.g. one bin (e.g. 408, depicted in FIG. 4A) in order to extract a sought signal (say $v_0$) from an object that is located at StartRange (at the obstacle).

Similarly, the same procedure applies to the second sample in each batch (e.g. $S_{1,2}$, $S_{2,2}$ ... $S_{NUM,2}$ in respective cycles $C_1$, $C_2$, ... $C_{NUM}$) that are fed through, say input $401_{(2)}$ in FIG. 4A and utilizing e.g. a different element in memory array 407 (e.g. bin $408_{(2)}$, depicted in FIG. 4A) in order to extract a sought signal $v_1$ reflected from an object that is located at StartRange+C(2*SamplingFrequency), and so forth for all the x samples (e.g. 2000 in the example of FIG. 4A) in the batch that are fed to respective inputs $401_{(2)}$ to $401_{(x)}$, for extracting corresponding x signal values ($v_0$– $v_{x-1}$) that are reflected from objects that are displaced in the range of EndRange–StartRange.

Turning now to FIG. 3D, it illustrates schematically the so detected sought signals $v_0$ to $v_{x-1}$ (say x=2000) from objects residing in the range of EndRange–StartRange. The detection of the sought signals $v_0$ to $v_{x-1}$, (by this example x=2000) allows to reveal objects in a desired depth behind the wall, for various applications as exemplified in a non-limiting manner above. The graph signal of FIG. 3D is provided for illustrative purposes only and does not represent meaningful real-life results. Note that there is the first portion of the graph, in which the signal has non-zero values, indicating, apparently, the existence of an object(s) at the near section behind the wall (from which signals were reflected), compared to a nearly zero signal value at the end portion of the graph, indicating that there are apparently no objects at the farther section behind the wall.

Figure 6A:
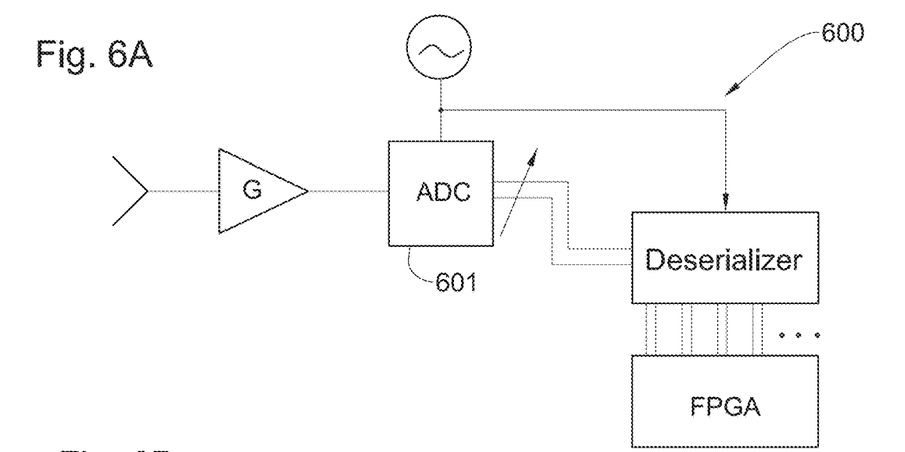
FIG. 6A illustrates schematically a signal extractor system, according to another embodiment of the presently disclosed subject matter.
Figure 6B:
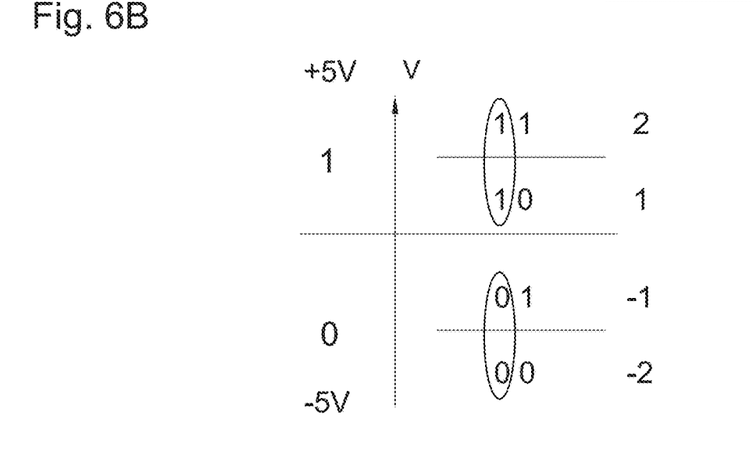
FIG. 6B illustrates schematically an improved granularity of the samples, when using the signal extractor system of FIG. 6A.

Attention is now drawn to FIG. 6, illustrating schematically a signal extractor system, according to another embodiment of the presently disclosed subject matter, where n bit long (n>1) samples are used. The n>1 bit sample improves the granularity of the sampled value(s) compared to the 1 bit example, thereby facilitating extraction of a more accurate sought signal. Thus, for example, with reference to FIG. 6B, whereas in the 1 bit example, two values are applicable (e.g. "1" and "0"), in, say, 2 bit sampling, 4 values are applicable. Thus, by way of an example, two out of the four values "describe" a negative sample, sampled say from section 355 of the noisy signal (see FIG. 3B). These negative values are, say, "–2", and "–1" are indicative of high and low negative values respectively (e.g. value<(–$V_{(-)}$), and (–$V_{(-)}$)<value<0, respectively), where V(–) is the negative values threshold) and two (out of the 4) being positive values, say, "2", and "1" indicative of high and low positive values respectively (e.g. value>($V_{(+)}$) and ($V_{(+)}$)>value>0, respectively), where $V_{(+)}$ is a positive values threshold). The values "–2", "–1", "1" and "2" as well as $V_{(-)}$ and $V_{(+)}$ are, of course, only examples.

The better granularity of the sampled values will facilitate extraction of a more accurate sought signal (as described in the context of FIG. 5). Turning now to FIG. 6A, a similar circuitry 600 to that described with reference to FIG. 2 is shown. Note that instead of a 1-bit comparator, a known per se ADC module 602 of n-bit (n>1) samples may be utilized.

The FPGA of FIG. 6A functionally allocates N bins per sample (say $2^n$), and in the case of 2 bit samples, to 4 bins per sample. Thus, for example, in case of four bins the "2" sampled values are summed to the first bin, the "1" sampled values may be summed to the second bin, the "–1" sampled values may be associated and summed to the third bin, and the "–2" sampled values are summed to the fourth bin, giving rise to the specified N-bins histogram (per sample). This may result in e.g. data indicative of a histogram of summed values for each bin, or e.g. data indicative of a N-bins histogram (e.g. obtained by dividing the summed value in each bin by the total number of samples Nun). The latter may also be referred to as the estimate for the probability distribution of the sought signal (sampled by N bins), all as described in detail above. Note that the various modifications for obtaining the data indicative of N bins histogram discussed above with reference to the 1 bit samples, is applicable mutatis mutandis also to the case of n>1 samples.

Having obtained the N-bins histogram (per sample) or normalized N-bins histogram, the sought sample value may be extracted, using known-in-the art-techniques, in estimation theory, to estimate the signal value given its estimated probability distribution (the normalized N-bins histogram) and the prior knowledge about the additive noise distribution (e.g. Gaussian distribution with zero mean and known standard deviation).

Note that the more accurate result may involve a more complex circuitry, e.g. an ADC instead of a comparator, and more demanding circuitry and bit-rates, e.g. in terms of power consumption, thus reducing battery life span, for implementing the FPGA that "supports" a larger numbers of bits.

Note that in accordance with certain other embodiments, n bit samples (n>2) may be used, mutatis mutandis.

Note that n-bit sampling (n>1) may apply to a single sample per cycle, or a batch of samples per cycle, all as described in detail above, mutatis mutandis.

As explained with reference to various embodiments of the invention, the noisy signal may have a low SNR, or may be referred to intuitively also as the signal buried in the noise. In accordance with various embodiments, this may require that the noisy signal may not saturate the sampler (comparator or ADC). Thus, with reference to FIG. 3B and for a 1-bit sample, if the signal $v_0$ is positive, there should be "sufficient" negative tail (section 355). The latter may dictate that there are sufficient samples of both options, e.g. in case of majority of "1" sampled values, there should still be enough "0" sampled values, in the resulting 2-bins histogram, in order to extract the sought signal in the subsequent signal extraction step (see e.g. module 450 in FIG. 4B). In other words, had all the sample values been "1" (or by the same token all were "0"), i.e. saturated 2-bits histogram (amounting for only "1"s or only "0"s), then no meaningful sought signal can be obtained. Thus, intuitively, there should be sufficient samples in each bin in the 2-bins histogram, in order to facilitate extraction of the sought signal value.

By another embodiment where n bit (n>1) samples are utilized, this intuitive requirement of sufficient samples in each bin may be required, for instance in accordance with the following equation.

$$\max_{bins}\{Nbins\ \text{Histogram}\} < Num$$

In accordance with certain embodiments, where N bins are utilized, the requirement for sufficient samples complies with and said low SNR complies with the following equation:

$$\text{Min}\{P_1, P_2, \ldots P_N\} \cdot \text{Num} > 1,$$

wherein $P_1, P_2, \ldots P_N$ are the normalized N-bins Histogram probabilities, and Num stands for the number of said plurality of samples, and N stands for the $N^{th}$ bin of N number of bins.

Note that whereas the explanation above referred to Gaussian distribution, the invention is by no means bound by the specified Gaussian distribution, and other statistical distributions of noise are applicable mutatis mutandis.

It is appreciated that, unless specifically stated otherwise, certain features of the presently disclosed subject matter which are described in the context of separate embodiments, can also be provided in combination in a single embodiment. Conversely, various features of the presently disclosed subject matter, which are described in the context of a single embodiment, can also be provided separately or in any suitable sub-combination. Those versed in the art will readily appreciate that the teachings of the presently disclosed subject matter are not bound by the systems illustrated in FIGS. 2, 4A, 4B and 6A; equivalent and/or modified functionality can be consolidated or divided in another manner and can be implemented in any appropriate combination of software with firmware and hardware.

It should be noted that whenever a term is used in the description (such as N-bins histogram, Normalized N-bins histogram, number of samples per bin, etc.) it also encompasses data indicative of the respective term.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method for extracting a sought signal from a noisy signal, the method comprising, by a circuitry:
   a) sampling a plurality of samples in a series of cycles of the noisy signal wherein each sample having an n-bit sampled value (n≥1), giving rise to a plurality of samples each associated with a respective cycle of said series;
   and wherein each sample is sampled at time T relative to the origin of the respective cycle;
   b) associating data indicative of the plurality of n-bit samples to N bins according to the corresponding sampled values, wherein N is a function of n, and
   c) calculating data indicative of a number of samples for each bin, giving rise to data indicative N-bins histogram or normalized N-bins histogram;
   d) determining the signal value based on the data indicative of the N-bins histogram or normalized N-bins histogram,
   wherein the SNR of said noisy signal is low and wherein said low SNR complies with the following equation:

$$\text{Min}\{P_1, P_2, \ldots P_N\} \cdot \text{Num} > 1,$$

wherein $P_1, P_2, \ldots P_N$ are the normalized N-bins Histogram probabilities, and Num stands for the number of said plurality of samples, and N stands for the number of bins in the histogram.

2. The method according to claim 1 wherein said step (a) further includes:
   i) sampling in each cycle a batch of samples that includes a succession of at least two samples and performing said steps a-c with respect to each sample in the batch, giving rise to a determined series of signal values, constituting said sought signal.

3. The method according to claim 1, wherein said N being a function of n equals to $2^n$.

4. The method according to claim 1, wherein said steps a-c are performed while said sought signal is retained substantially invariable.

5. The method according to claim 1, wherein said cycle time duration depends on a signal repletion frequency.

6. The method according to claim 1, wherein said plurality of samples are sampled at a frequency that complies with the Nyquist sampling theorem.

7. The method according to claim 1, wherein the noisy signal is characterized by a Gaussian distribution.

8. The method according to claim 1, wherein said n=1.

9. The method according to claim 8, wherein the data indicative of the samples being "1" or "0" according to the sign of the sample and wherein number of bins N=2.

10. The method according to claim 9, wherein the data indicative of normalized N bins histogram complies with the equation:

$$\text{Num}^{(+)}/(\text{Num}^{(+)}+\text{Num}^{(-)}), \text{or } \text{Num}^{(-)}/(\text{Num}^{(+)}+\text{Num}^{(-)}),$$

where $\text{Num}^{(+)}$ equals the number of positive signs and $\text{Num}^{(-)}$ equals the number of negative signs and $\text{Num}^{(+)}+\text{Num}^{(-)}$ equals the number of said plurality of samples.

11. The method according to claim 10, wherein said determined signal value complies with the equation:

$$v_0 = -\sqrt{2}\sigma \cdot \text{erfc}^{-1}(2 \cdot \text{Num}^{(+)}/\text{Num}).$$

12. The method according to claim 1, for use in a through-wall image acquisition device having antenna elements for transmitting and receiving signals adapted to pass through at least one obstacle for imaging objects.

13. A system for extracting a sought signal from a noisy signal, the system comprising a circuitry that includes:
   a sampler for sampling a plurality of samples in a series of cycles of the noisy signal wherein each sample has an n-bit sampled value (n≥1), giving rise to a plurality of samples each associated with a respective cycle of said series;
   and wherein each sample is sampled at time T relative to the origin of the respective cycle;
   a processing circuitry operatively coupled to said sampler, for associating data indicative of the plurality of n-bit samples to N bins according to the corresponding sampled values, wherein N is a function of n, and the processing circuitry is further adapted to calculate data indicative of a number of samples for each bin, giving rise to a data indicative N-bins histogram or a normalized N-bins histogram;

the processing circuitry is further adapted to determine the signal value based on the data indicative of the N-bins histogram or normalized N-bins histogram, wherein the SNR of said noisy signal is low and wherein said low SNR complies with the following equation:

$$\text{Min}\{P_1, P_2, \ldots P_N\} \cdot \text{Num} > 1,$$

wherein $P_1, P_2, \ldots P_N$ are the normalized N-bins Histogram probabilities, and Num stands for the number of said plurality of samples, and N stands for the number of bins in the histogram.

14. The system according to claim 13, further comprising a Deserializer module operatively coupled to said sampler for reducing the bit-rate of the sampler to correspond to an operable processing rate of the processing circuitry.

15. The system according to claim 13, wherein said sampler is adapted to sample, in each cycle, a batch of samples that includes a succession of at least two samples, and wherein said processing circuitry is adapted to performing said associating, calculating and determining with respect to each sample in the batch, giving rise to a determined series of signal values, constituting said sought signal.

16. The system according to claim 13, wherein said N being a function of n equals to $2^n$.

17. The system according to claim 13, wherein said steps a-c are performed while said sought signal is retained substantially invariable.

18. The system according to claim 13, wherein said cycle time duration depends on a signal repletion frequency.

19. The system according to claim 13, wherein said plurality of samples are sampled at a frequency that complies with the Nyquist sampling theorem.

20. The system according to claim 13, wherein the noisy signal is characterized by a Gaussian distribution.

21. The system according to claim 13, wherein said n=1 and said sampler being a comparator.

22. The system according to claim 21, wherein the data indicative of the samples being "1" or "0" according to the sign of the sample and wherein number of bins N=2.

23. The system according to claim 22, wherein the data indicative of normalized N bins histogram complies with the equation:

$$\text{Num}^{(+)}/(\text{Num}^{(+)}+\text{Num}^{(-)}), \text{ or } \text{Num}^{(-)}/(\text{Num}^{(+)}+\text{Num}^{(-)}),$$

where $\text{Num}^{(+)}$ equals the number of positive signs and $\text{Num}^{(-)}$ equals the number of negative signs and $\text{Num}^{(+)}+\text{Num}^{(-)}$ equals the number of said plurality of samples.

24. The system according to claim 23, wherein said determined signal value complies with the equation:

$$v_0 = -\sqrt{2}\sigma \cdot \text{erfc}^{-1}(2 \cdot \text{Num}^{(+)}/\text{Num}).$$

25. The system according claim 13, for use in a through-wall image acquisition device having antenna elements for transmitting and receiving signals adapted to pass through at least one obstacle for imaging objects.

* * * * *